US007605197B2

(12) United States Patent
Matuana et al.

(10) Patent No.: US 7,605,197 B2
(45) Date of Patent: Oct. 20, 2009

(54) PROCESS FOR THE PREPARATION OF MALEATED POLYOLEFIN MODIFIED WOOD PARTICLES IN COMPOSITES AND PRODUCTS

(75) Inventors: Laurent Matuana, Holt, MI (US); Karana Carlborn, Hancock, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 826 days.

(21) Appl. No.: 11/186,065

(22) Filed: Jul. 21, 2005

(65) Prior Publication Data

US 2006/0022372 A1 Feb. 2, 2006

Related U.S. Application Data

(60) Provisional application No. 60/592,918, filed on Jul. 30, 2004.

(51) Int. Cl.
*B29C 43/02* (2006.01)

(52) U.S. Cl. .......................................... 524/13; 264/109

(58) Field of Classification Search ....................... None
See application file for complete search history.

(56) References Cited

U.S. PATENT DOCUMENTS

| | | | | |
|---|---|---|---|---|
| 5,120,776 | A | 6/1992 | Raj et al. | |
| 6,716,928 | B2 * | 4/2004 | Botros | 525/285 |
| 2001/0052657 | A1 * | 12/2001 | Jacobsen | 264/211 |
| 2004/0214925 | A1 * | 10/2004 | Sigworth | 524/13 |
| 2005/0058822 | A1 * | 3/2005 | Ittel | 428/304.4 |
| 2005/0154095 | A1 * | 7/2005 | Heath et al. | 524/35 |

OTHER PUBLICATIONS

K. Carlborn and L. M. Matuana, "Biobased Composites Manufactured Through a Reactive Extrusion of Maleated Wood Particles" ANTEC 2004 Proceedings—May 16-20, 2004, 1619-1623.

M. Kazayawoko et al., "Surface modification and adhesion mechanisms in woodfiber-polypropylene composites" Journal of Materials Science 34 (1999) 6189-6199.

M. Kazayawoko et al., "X-ray photoelectron spectroscopy of maleated polypropylene treated wood fibers in a high-intensity thermokinetic mixer" Wood Science and Technology 35 (1999) 359-372.

K. Carlborn and L.M. Matuana, "Composite Materials Manufactured from Wood Particles Modified Through a Reactive Extrusion Process" Polymer Composites, vol. 26, No. 4 (Aug. 2005) 534-541.

K. Carlborn and L.M. Matuana, "Functionalization of Wood Particles through a Reactive Extrusion Process" Journal of Applied Polymer Science, vol. 101, 3131-3142 (2006).

K. Carlborn and L.M. Matuana, "Influence of Processing Conditions and Material Compositions on the Performance of Formaldehyde-Free Wood-Based Composites" Polymer Composites (2006) 599-607.

K. Carlborn and L.M. Matuana, "Modeling and Optimization of Formaldehyde-Free Wood Composites Using a Box-Behnken Design" Polymer Composites (2006) 497-503.

L.M. Matuana, R.T. Woodhams, J.J. Balatinecz and C.B. Park, "Influence of Interfacial Interactions on the Properties of PVC/Cellulosic Fiber Composites" Polymer Composites (1998) vol. 19, No. 4, 446-455.

Q. Li and L. Matuana, "Effectiveness of Maleated and Acrylic Acid-Functionalized Polyolefin Coupling Agents for HDPE-Wood-Flour Composites" Journal of Thermoplastic Composite Materials (Nov. 2003) vol. 16, 551-564.

R.T. Woodhams, G. Thomas and D.K. Rodgers, "Wood Fibers as Reinforcing Fillers for Polyolefins" Polymer Engineering and Science, (Oct. 1984) vol. 24 No. 15, 1166-1171.

J.M. Felix and P. Gatenholm, "The Nature of Adhesion in Composites of Modified Cellulose Fibers and Polypropylene" Journal of Applied Polymer Science, vol. 42, 609-620 (1991).

D. Maldas, B.V. Kokta and C. Daneault, "Influence of Coupling Agents and Treatments on the Mechanical Properties of Cellulose Fiber-Polystyrene Composites" Journal of Applied Polymer Science, vol. 37, 751-775 (1989).

J. Gassan and A. Bledzki, "The influence of fiber-surface treatment on the mechanical properties of jute-polypropylene composites" Composites Part A 28A (1997) 1001-01005 (PII:S1359-83X(97)00042-0).

Maloney, T.M., Forest Prod. J., 46(2): 19-26 (1996).

Guss, L.M., Forest Prod. J., 45 (7/8): 17-24 (1995).

Sellers, T., Wood Technol. May/Jun. Issue: pp. 40-43 (2000).

Wang, W., et al., Forest Prod. J., 53(3): 65-72 (2003).

Maloney, T.M., Modern Particleboard and Dry Process Fiberboard Manufacturing. Updated edition. Miller Freeman, SanFrancisco, Ca. (1993).

Anonymous, "summary of working draft of proposed rule for plywood and composite wood products," National Emission Standards for Hazardous Air Pollutants (NESHAP), Rule Development Project Lead: Greg Nizich, U.S. Environmental Protection Agency (EPA), Aug. 2002.

Anonymous, "Fact sheet: Composite Wood Products," California Air Resources Board Website, Mar. 2003.

Pizzi, A., Wood adhesives: Chemistry and Technology, vol. 1, edited by A. Pizzi, Marcel Dekker, New York (1983).

Matuana, L.M., et al., Eur. Polym. J., 29 (4): 483-490 (1993).

Kazayawoko, J.S.M., et al., Holzforschung, 46(3): 257-261 (1992).

Velasquez, J.A., et al., Holz als Roh-und Werkstoff 60:297-302 (2002).

(Continued)

*Primary Examiner*—Mary Lynn F Theisen
(74) *Attorney, Agent, or Firm*—Ian C. McLeod

(57) ABSTRACT

Wood particles or fibers and a maleated polyolefin are used to produce a composite in absence of a non-maleated polyolefin. The composite has properties enabling use in homes and avoiding the risk of formaldehyde based adhesives or other hazardous air pollutants.

40 Claims, 5 Drawing Sheets

OTHER PUBLICATIONS

Widsten, P., et al., Holzforschung 57:447-452 (2003).
Li, Q., et al., J. Appl. Polym. Sci. 88: 278-286 (2003).
Matuana, L.M., et al., Wood Sci. technol., 35: 191-201 (2001).
Kazayawoko, M., et al., J. Appl. Polym. Sci. 66: 1163-1173 (1997).
ANSI A208.1-1999, Particleboard, The Composite Panel Association, Gaithersburg, 1-11(1999).
Barry, A., et al. Forest Prod J., 50(10) 35-42 (2000).
US EPA, Federal Register, 69(146) 45944-46045, (2004).

* cited by examiner

PROCESS FOR THE PREPARATION OF MALEATED POLYOLEFIN MODIFIED WOOD PARTICLES IN COMPOSITES AND PRODUCTS

CROSS REFERENCE TO RELATED APPLICATIONS

This application claims priority to Provisional Patent Application Ser. No. 60/592,918 filed Jul. 30, 2004.

GOVERNMENT RIGHTS

This work was partially supported by the USDA-CSREES Grant-Advanced Technology Applications to Eastern Hardwood Utilization. The U.S. Government has certain rights to this invention.

BACKGROUND OF THE INVENTION (1) Field of the Invention

This invention relates to a reactive extrusion or blending process as a means of developing a new, formaldehyde-free binding system for wood composite products. The surfaces of dried wood particles were particularly modified by grafting anhydride modified polyolefin using reactive blending or extrusion. Chemical changes resulting from this treatment were followed the FTIR and XPS spectra. The modified wood particles were compression-molded into panels, in absence of a non-functionalized polyolefin, which were tested for physico-mechanical properties. Both FTIR and XPS data revealed that the chemical reactions have taken place between the hydroxyl groups of wood particles and anhydride modified polyolefin. The results showed that the performance of composite panels compared favorably with current standard requirements for particleboard.

(2) Description of Related Art

Wood-based composites are commonly made using formaldehyde-based adhesives, including urea-formaldehyde, melamine-formaldehyde, and phenol-formaldehyde (Maloney, T. M., *Forest Prod. J.,* 46 (2): 19-26 (1996); Guss, L. M., *Forest Prod. J.,* 45 (7/8): 17-24 (1995); and Sellers, T., *Wood Technol*. May/June Issue: pp. 40-43 (2000)). In 1998, 1,780 kilotons of adhesive resin solids were used to produce primary glued wood products (excluding the adhesive used to bond furniture and other secondary wood products). Of this amount, nearly 92% were formaldehyde-based adhesives (Sellers, T., *Wood technol*., May/June Issue: pp. 40-43 (2000)).

Plants that produce wood composites using formaldehyde-based adhesives emit harmful chemicals to the environment. These include phenol, formaldehyde, ketones, and other compounds, which are known hazardous air pollutants (HAPs) (Wang, W., et al., *Forest Prod. J.,* 53(3):65-72 (2003); and Barry, A. et al., Forest Prod. J., 50(10):35-42 (2000)). Common composite products such as plywood, oriented strandboard and particleboard are used in building construction and in furniture, which is a concern as these products also tend to release formaldehyde over time (Maloney, T. M., *Modern Particleboard and Dry Process Fiberboard Manufacturing*. Updated edition. Miller Freeman, San Francisco, Calif. (1993)). Wood composites made today emit far less formaldehyde than those made 20 years ago, but the problem has not been eliminated. Formaldehyde and other toxic compounds may be present in large amounts in both indoor and outdoor air as a consequence of the use of these adhesives (Anonymous, "summary of working draft of proposed rule for plywood and composite wood products," National Emission Standards for Hazardous Air Pollutants (NESHAP), Rule Development Project Lead: Greg Nizich (nizich.greg@epa.gov), U.S. Environmental Protection Agency (EPA), Technology Transfer Network-Air Toxics Website, August 2002, http://www.epa.gov/ttn/atw/plypart/plypart.html).

As a result of public concern about the environment, the Environmental Protection Agency (EPA) has enacted new rules for facilities that manufacture plywood and composite wood products in September 2004 (U.S. EPA, Federal Register, 69 (146): 45943-46046 (2004)). These rules affect both new and existing plants that produce at least 10 tons of any one HAP per year, or any combination of 25 tons of HAPs per year. The California Air Resources Board has gone even further; proposing a regulation that would eliminate urea-formaldehyde based wood composites from being sold in California, regardless of where they were made (Anonymous, "Fact sheet: Composite Wood Products," California Air Resources Board Website, march 2003, http://www.arb.ca.gov). These regulations will force industry to find new ways to bind composite products without the use of formaldehyde-based adhesives.

In recent years, there have been several studies into environmentally friendly wood adhesives (Sellers, T., *Wood Technol*., May/June Issue: pp. 40-43 (2000)). Some of the areas that have been investigated include urea-formaldehyde adhesives with low formaldehyde-to-urea molar ratios, and the development of tannin, lignin, soybean and cornstarch adhesives (Sellers, T., *Wood technol*., May/June Issue: pp. 40-43 (2000); and Pizzi, A., *Wood adhesives: Chemistry and Technology*, Volume 1, edited by A. Pizzi, Marcel Dekker, New York (1989)), and phenol-formaldehyde resins modified with lignin (Matuana, L. M., et al., *Eur. Polym. J.,* 29 (4): 483-490 (1993) and Kazayawoko, J. S. M., et al., Holzforschung, 46(3): 257-261(1992)). Additives that reduce formaldehyde release during composite pressing and during board use have also been developed and are currently in use (Pizzi, A., *Wood Adhesives: Chemistry and Technology, Volume* 1, edited by A. Pizzi, Marcel Dekker, New York (1989)). The regulation of formaldehyde emissions has lead to some development of fiberboard without synthetic adhesives (Velasquez, J. A., et al., *Holz als Roh-und Werkstoff* 60:297-302(2002); and Widsten, P., et al., Holzforschung 57:447-452 (2003)). The binderless boards and those made with natural adhesives tend to have poorer mechanical properties than those made with synthetic adhesives.

Prior work demonstrated the ability to graft maleated polyolefins to cellulose through a wet process (Li, Q., et al., *J. Appl. Polym. Sci.* 88: 278-286 (2003)). However, the wet process had the drawback of using organic solvents which had to be removed through drying. Therefore, the wet process is both expensive and time consuming on an industrial scale.

OBJECTS

It is an object of the present invention to provide wood composite products and a process for preparing them which use environmentally compatible polymers. It is further an object of the present invention to provide composite products and a process which is easily incorporated into existing particle board operations. These and other objects will become increasingly apparent from the following description and the drawings.

SUMMARY OF THE INVENTION

The present invention relates to a process for the preparation of a wood fiber or particle based composite which comprises:

(a) providing a mixture of dried wood fibers or particle and a maleic anhydride moiety coupled to a polyolefin prepared from a monomer containing 2 to 8 carbon atoms as a maleated polyolefin, and combinations thereof, in absence of a non-maleated polyolefin, and optionally an esterification catalyst for reacting the esterification maleic anhydride moiety with the wood fiber or particle;

(b) pressing the mixture in a mold at an elevated temperature so that the maleic anhydride moiety binds with a surface of the wood fiber or particle and the composite is formed. Preferably the pressing is at a pressure of between about 2 and 11 MPa (300 to 1600 psi). Preferably the pressing is at a temperature between the melting point of the polyolefin to the decomposition temperature of the wood fiber or particle. Preferably the temperature is between about 130° C. and 220° C. Preferably the catalyst is hydrated zinc acetate. Preferably the mixture in step (a) is blended in a mixer at 20 to 5000 rpm. Preferably the polyolefin is between about 3 and 20 weight percent of the mixture and the catalyst is between about 0.01 to 1 percent by weight. Preferably the polyolefin coupled to the maleic anhydride is selected from the group consisting of maleated polyethylene and maleated polypropylene. Preferably the polyolefin has an average molecular weight between about 10,000 and 100,000. Preferably the mixture is provided by extrusion or blending of the fiber or particle and polyolefin coupled to the maleic anhydride.

The present invention also relates to a process for the forming of a wood fiber or particle based composite which comprises:

(a) providing a mixture of a dried wood fiber or particle and a maleic anhydride moiety coupled to a polyolefin prepared from a monomer containing 2 to 8 carbon atoms as a maleated polyolefin, and combinations thereof, in absence of a non-maleated polyolefin, and optionally an esterification catalyst for reacting the esterification maleic anhydride moiety with the wood fiber or particle;

(b) reactively extruding in a screw extruder the mixture at a temperature of between about 130 to 200 so that the maleic anhydride moiety bonds with a surface of the wood or particle fiber to produce a surface modified fiber or particle (SMF); and (c) pressing the SMF in a mold to form the composite. Preferably the pressing is at a pressure of between about 2 and 11 MPa (300 to 1600 psi). Preferably the pressing is at a temperature between the melting point of the polyolefin to the decomposition temperature of the wood fiber or particle. Preferably the temperature is between about 130° C. and 220° C. Preferably the catalyst is hydrated zinc acetate. Preferably the extruder has twin counter-rotating screws. Preferably the mixture in step (a) is blended in a high-intensity mixer at 1000 to 5000 rpm. Preferably the polyolefin is between about 5 and 20 weight percent of the mixture and the catalyst is between about 0.01 to 1 percent by weight. Preferably the polyolefin coupled to the maleic anhydride is selected from the group consisting of maleated polyethylene and maleated polypropylene. Preferably the maleated polyolefin has an average molecular weight between about 10,000 and 100,000.

The present invention also relates to a process for the forming of a wood fiber or particle based composite which comprises:

(a) providing a mixture of a dried wood fiber or particle and a polymer with reactive anhydride moiety coupled to a polyolefin prepared from a monomer containing 2 to 8 carbon atoms, and combinations thereof, in absence of a polymer without the reactive moiety;

(b) reactively heating the mixture so that the moiety bonds with a surface of the wood or particle fiber to produce a surface modified fiber or particle (SMF); and (c) pressing the SMF in a mold to form the composite. Preferably the composite product is 79 to 97% by weight wood fiber.

The present invention also relates to a wood-plastic composite product produced by a process comprising:

(a) providing:

i. dry wood fibers or particles;

ii. a polyolefin polymer having an anhydride moiety reactive with the wood fiber or the particles moiety, in absence of a polyolefin without the moiety;

iii. a catalyst for reacting said polymer to said dry wood fibers or particles;

(b) mixing said wood fibers or particles, said polymer, and said catalyst;

(c) heating the mixture of step (b) so as to effect the reaction of the polymer reactive moiety with the wood fibers so as to produce surface-modified wood fibers (SMFs); and (d) attaching the SMFs of step (c) to each other via the polyolefin moiety of the polymer to produce the composite. Preferably the dry wood fibers or particles and the polymer are reactively mixed in step (b) in a screw extruder. Preferably the dry wood fibers or particles and the polymer are mixed in step (b) in a kinetic mixer. Preferably the SMFs are attached to each other by pressing in a mold. Preferably steps (c) and (d) are conducted simultaneously by heating the mixture of step (b) under pressure in a mold.

The present invention also relates to a wood-polymer composite consisting essentially of wood particles modified with a polymer, said polymer having a first part comprising an anhydride moiety reactive toward said wood fibers and a second part comprising the polyolefin polymer, said modified wood particles linked to each other via a second part of the polymer. Preferably the polymer is a maleated polyolefin. Preferably the modified polyolefin polymer is selected from the group consisting of maleated polypropylene and maleated polyethylene. Preferably the modified polyolefin polymer has a molecular weight between about 10,000 and 100,000.

The anhydride moiety is preferably maleic anhydride. Other moieties are succinic anhydride, phthalic anhydride, acrylic acid or other esterification moieties.

The catalyst is preferably hydrated zinc acetate. Other catalysts are any various esterification catalysts.

The fibers are preferably any wood fibers. Other lignocellulosic fibers or particles may be used.

The polyolefin is preferably polypropylene or polyethylene. Other polymers are polybutene and polystyrene, biopolymers, and others with melting temperatures between 130°-200° C.

Figure 2:
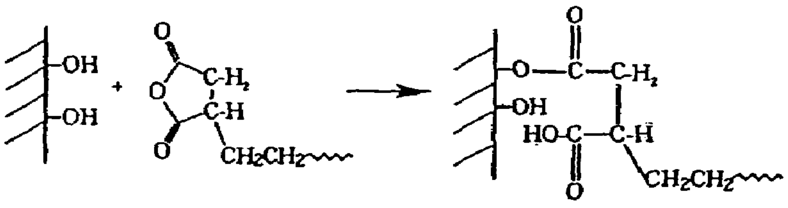
Figure 2A:
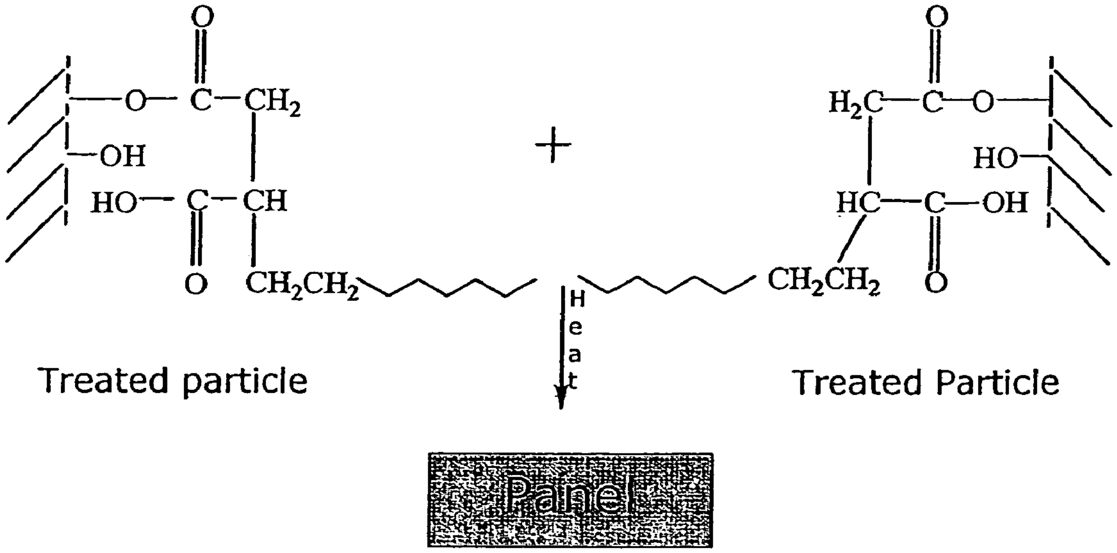

FIG. 2 shows the modification scheme for esterification reaction between wood particles and maleated polyethylene. FIG. 2A shows a bonding scheme between particles treated with maleated polyolefins.

Figure 3A:
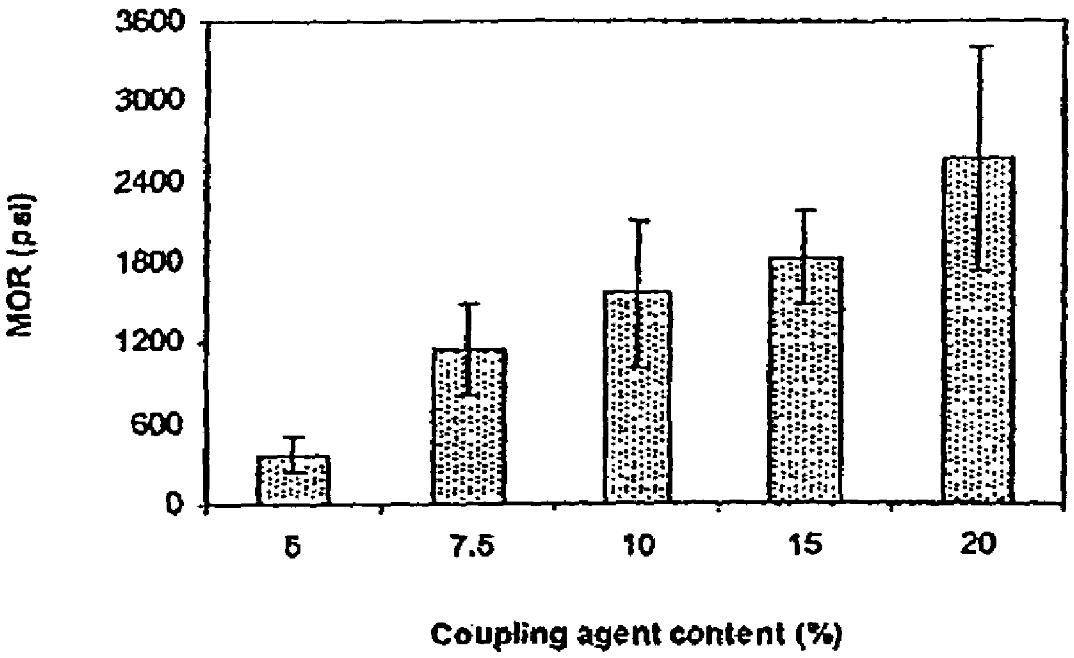
Figure 3B:
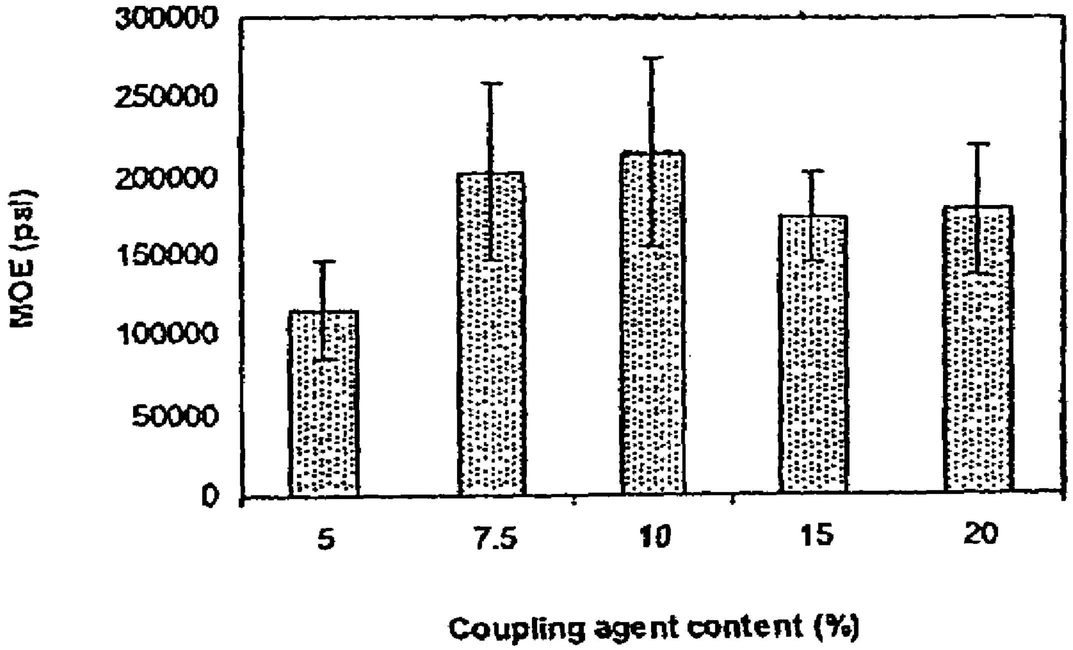

FIGS. 3A and 3B are graphs showing the effect of maleated polyethylene (MAPE) (coupling agent) content on the modulus of rupture (MOR or strength) and modulus of elasticity (MOE or stiffness) of the composites.

Figure 4A:
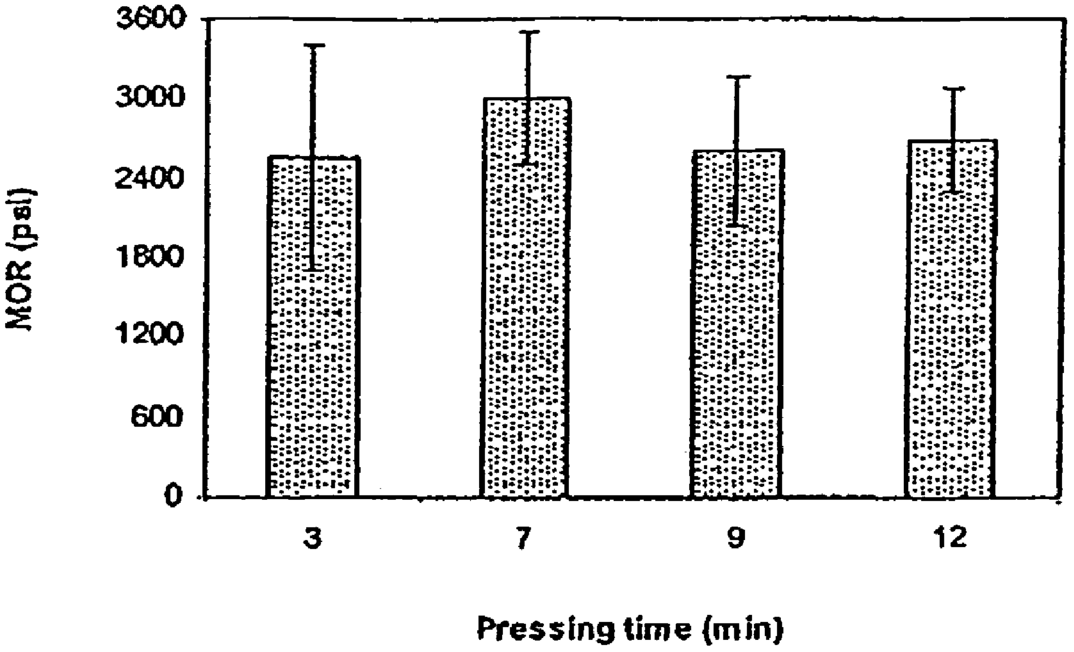
Figure 4B:
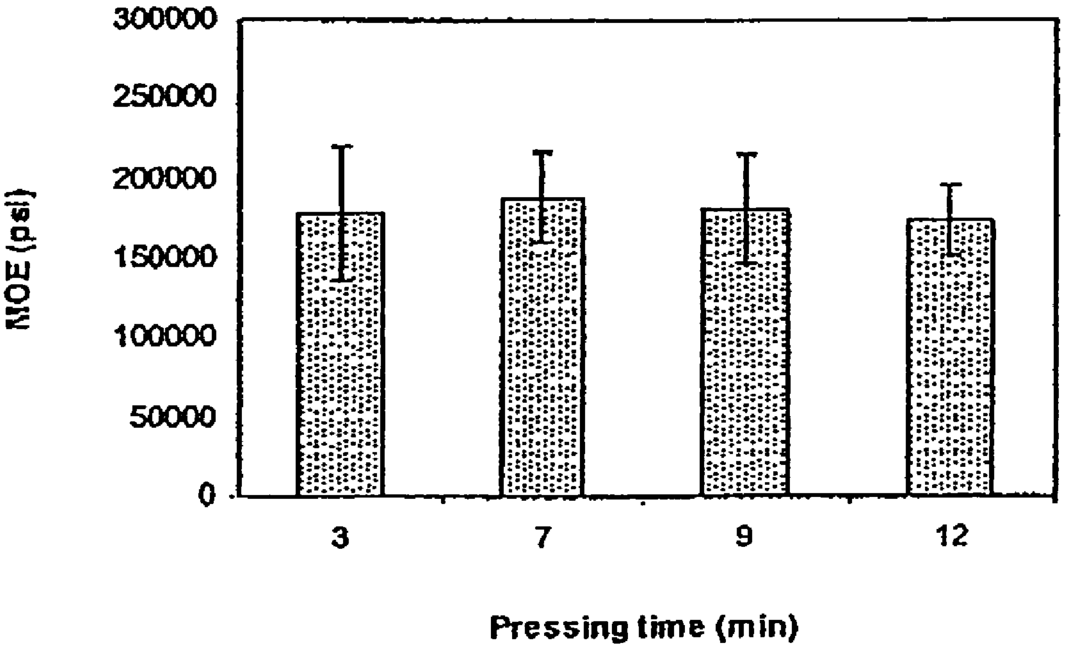

FIGS. 4A and 4B are graphs showing the effect of panel's pressing times on the modulus of rupture (MOR or strength) and modulus of elasticity (MOE or stiffness) of the composites. The panels were made with fibers treated with 20% maleated polyethylene (MAPE).

Figure 5A:
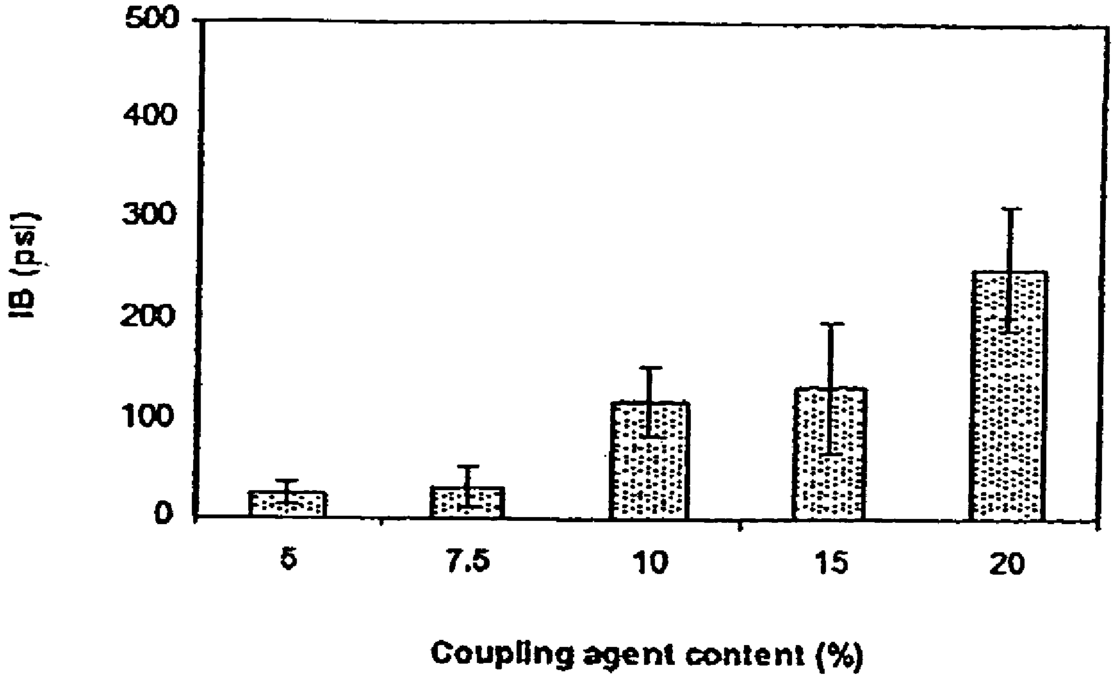
Figure 5B:
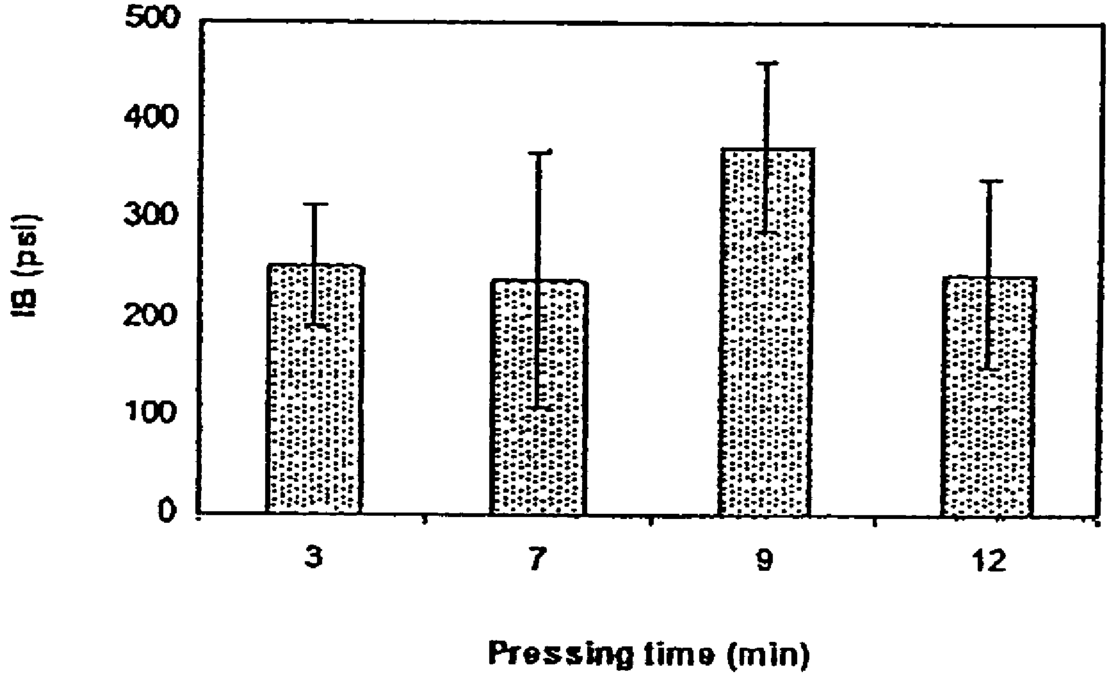

FIGS. 5A and 5B are graphs showing the effects of maleated polyethylene (MAPE) content and panel's pressing times on the internal bond (IB) of the composites.

DESCRIPTION OF PREFERRED EMBODIMENTS

Maleated polyethylene or polypropylene were grafted to wood particles in order to bond the wood particles together without the use of additional adhesive or non-maleated polyolefin.

In a preferred embodiment the invention uses a reactive extrusion process as a means of developing a new, formaldehyde-free binding system for wood composite products. The effectiveness of the modification as followed by both Fourier transform infrared (FTIR) spectroscopy and X-ray photoelectron spectroscopy (XPS). FTIR is useful in determining the presence of functional groups, while XPS can reveal the elemental composition on the surface of materials (Li, Q., et al., *J. Appl. Polym. Sci.,* 88:278-286 (2003); Matuana, L. M., et al., *Wood Sci. technol.,* 35: 191-201 (2001); and Kazayawoko, M., et al., *J. Appl. Polym. Sci.* 66: 1163-1173 (1997)). Panels were pressed from the modified wood particles and mechanical properties of the resulting panels were tested and compared with current standard requirements for conventional particleboard (ANSI A208.1-1999, Particleboard, The Composite Panel Association, Gaithersburg, 1-11 (1999)).

EXAMPLE 1

Experimental

Materials

Maple wood flour of 425 micron (40-mesh) and 150 micron (100-mesh) size were supplied by American Wood Fibers (Schofield, Wis.)) and were used as particles. The 150 micron particles were used for the analytical work because the diffuse reflectance IR technique required very small particles to minimize the effects of scattering and specular reflectance in the samples. However, these small particles were difficult to feed into the extruder. Since panel manufacturing required a large quantity of modified particles, larger (425 micron) particles, which were easier to process, were used in panel manufacturing and mechanical property testing. Hydrated zinc acetate, the catalyst, and xylene (99.9%, ACS Grade), the solvent used for Soxhlet extraction, were obtained from Baker Analytical Reagents (JT Baker Co., Phillipsburg, N.J.). Maleated polyethylene (PMG-2010) supplied by Eastman Chemical Co. (Kingsport, Tenn.) was used as the coupling agent. The wood particles were dried for 48 hours at 105° C. to a final moisture content of less than one percent before processing. All other chemicals were used as received.

Reactive Extrusion of Wood Particles

A 10-liter high intensity mixer (Papenmeier TGAHK20-Germany) was used for dry blending of the wood particles, coupling agent, and catalyst. All components were combined in the mixer and blended for 10 minutes at room temperature. Amounts of all components used in the formulation are shown in Table 1.

TABLE 1

Formulation used for surface modification of wood particles and composite manufacture

| Ingredients | % Total in Composite | Weight (g) |
|---|---|---|
| Maple particles | 79% | 790 |
| Maleated PE | 20% | 200 |
| Hydrated zinc acetate | 1% | 10 |

The mixture was then fed into a 32 mm conical counter rotating twin screw extruder (C.W. Brabender Instruments, Inc.) with a L/D ratio of 13:1, driven by a 7.5 hp Intelli-Torque Plasti-Corder Torque Rheometer® (South Hackensack, N.J.). Based on preliminary work, the barrel temperature for the three zones inside the extruder were set at 160° C., and the rotational speed of the screws was held at 80 rpm. No die was used to extrude these particles.

Extraction of Modified Wood Particles

Modified 150 micron wood particles were Soxhlet extracted with xylene for 24-hours following the approach described by Li and Matuana (14). Particles were extracted after modification to remove any unreacted coupling agent, and were then analyzed by FTIR. A second 24-hour Soxhlet extraction was then performed to make sure the removal of unreacted coupling agent was complete from the surface of wood particles upon the first extraction. FTIR and XPS analyses were performed on the particles after the second extraction.

Surface Characterization of Modified Wood Particles

Modified wood particles were dried to a constant weight at 105° C. and analyzed by infrared spectrophotometry, using a Nicolet Protégé 460 FTIR (Nicolet Instrument Co., Madison, Wis.). Spectra were recorded in Kubelka-Munk (K-M) units in the range of 4000-400 $cm^{-1}$, with a resolution of 4 $cm^{-1}$ and a coaddition of 128 scans for each spectrum. All spectra were collected using a diffuse reflectance (DRIFT) procedure with potassium bromide (KBr) as the reference.

X-ray photoelectron spectroscopy (XPS) was used to determine the concentration and types of carbon atoms, as well as the oxygen-to-carbon atomic ratios present on the surface of the wood particles before and after modification. XPS analysis was carried out on a Physical Electronics Phi 5400 ESCA System, (Physical Electronics USA, Chanhassen, Minn.) using a non-monochromatic Mg source and a takeoff angle of 45°. The procedure for XPS data collection and analysis was detailed in other articles (Li, Q., et al., *J. Appl. Polym. Sci.,* 88: 278-286 (2003: and Matuana, L. M., et al., *Wood Sci. Technol.,* 35:191-201 (2001)).

Panel Manufacturing and Mechanical Property Testing

Panels were prepared from modified 425 micron wood particles using a hydraulic press from Erie Mill Co. (Erie, Pa.). Panel dimensions were 380 mm by 380 mm by 6 mm, with a target density of 720 $kg/m^3$. Panels were pressed at 193° C. for 3 minutes using 8.3 MPa pressure. After pressing, panels were removed from the press and cooled at room temperature under compression for 15 minutes.

Three-point flexural tests were performed on an Instron 4206 testing machine (using Series IX software). The crosshead speed was 3.05 mm/min in accordance with ASTM standard D1037-99 (18). At least six samples were tested to obtain an average value for modulus of rupture (MOR) and modulus of elasticity (MOE), which were compared with values listed in the standard ANSI A208.1-1999 Particleboard (ANSI A208.1-1999, Particleboard, The Composite Panel Association, Gaithersburg, 1-11 (1999)).

Results and Discussion

Surface Characterization of Wood Particles

Figure 1:
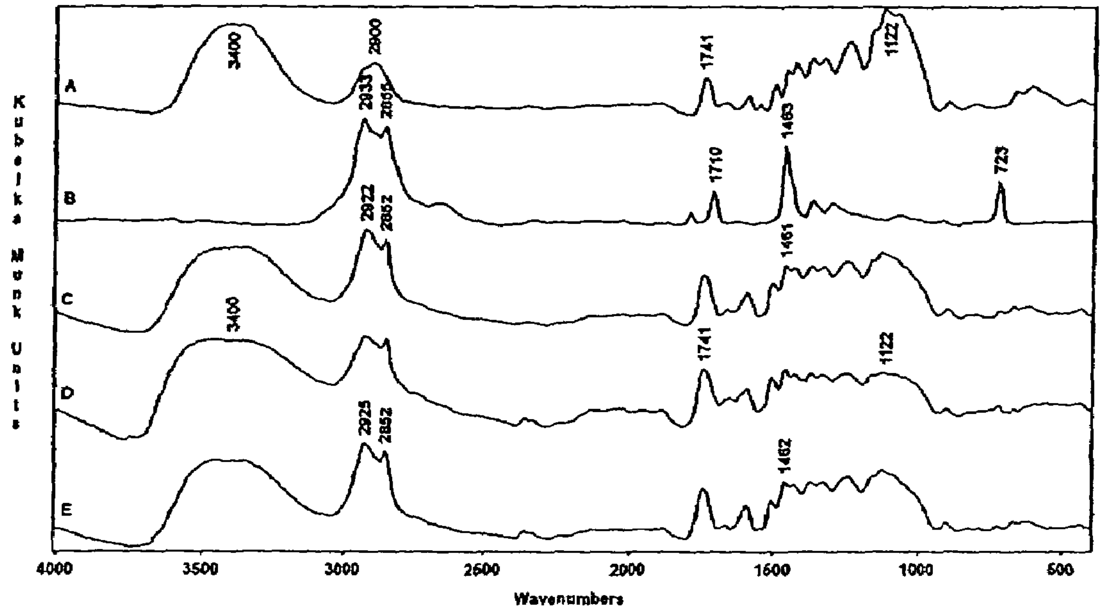
FIG. 1 shows a FTIR Spectra of (A) unmodified wood particles (B) maleated polyethylene (C) modified wood particles without extraction (D) modified wood particles with 24 hour-Soxhlet extraction, and (E) modified wood particles after a second 24 hour-Soxhlet extraction in the region 4000-400 $cm^{-1}$.

The FTIR spectra of unmodified and modified wood particles, along with the maleated polyethylene are shown in FIG. 1. The unmodified wood particles (spectrum A) showed an absorbance band at 3400 $cm^{-1}$, which is attributed to hydroxyl group stretching vibrations, and another at 2900 $cm^{-1}$, which is associated with C—H stretching vibrations. A band near 1740 $cm^{-1}$ is associated with C═O stretching vibrations, and another at 1122 $cm^{-1}$ is likely due to C—O stretching vibrations and C—C stretching from components of cellulose (Li, Q., et al., *J. Appl. Polym. Sci.,* 88:278-286 (2003); and Kazayawoko, M., et al., *J. Appl. Polym. Sci.* 66:1163-1173(1997)).

The spectra of maleated polyethylene (spectrum B) showed four distinct absorption bands. The bands at 2933 $cm^{-1}$ and 2855 $cm^{-1}$ are due to symmetrical and asymmetrical C—H stretching vibrations (Li, Q., et al., *J. Appl. Polym. Sci.,* 88:278-286 (2003)). The band at 1710 $cm^{-1}$ is from C═O stretching vibrations and the absorbance bands at 1463 $cm^{-1}$ and 723 $cm^{-1}$ are associated with vibrations of $CH_2$ from polyethylene chain ((Li, Q., et al., *J. Appl. Polym. Sci.,* 88:278-286 (2003)).

The modified wood particles (spectra C-E) also showed absorption bands at 3400 $cm^{-1}$, but the intensity of this peak decreased compared to the unmodified wood particles, indicating that there were less OH groups on the surface of modified samples. This was expected based on the reaction scheme shown in FIG. 2, where the maleated polyethylene reacts with the OH groups of wood particles forming an ester link (Li, Q., et al., *J. Appl. Polym. Sci.,* 88:278-286 (2003)). FIG. 2A shows the interparticle bonding. A distinct change was found near 2900 $cm^{-1}$, wherein two peaks near 2920 $cm^{-1}$ and 2852 $cm^{-1}$ replace the single peak in the unmodified wood particle spectra. These bands are characteristic of the maleated polyethylene (spectrum B), and are due to C—H stretching vibrations (Li, Q., et al., *J. Appl. Polym. Sci.,* 88:278-286 (2003); and Kazayawoko, M., et al., *J. Appl. Polym. Sci.,* 66:1163-1173 (1997)). Another indication of grafting of the maleated polyethylene was an increased intensity in the band at around 1740 $cm^{-1}$, possibly due to esterification reaction. A small peak at 1462 $cm^{-1}$ in the modified wood spectra is also indicative of the grafting reaction (Li, Q., et al., *J. Appl. Polym. Sci.,* 88:278-286 (2003)). It should also be mentioned that the intensity of the band at 1122 $cm^{-1}$ has decreased, likely due to less cellulose being detected on the surface because of the grafting of the maleated polyethylene (Li, Q., et al., *J. Appl. Polym. Sci.,* 88:278-286 (2003); and Kazayawoko, M., et al., *J. Appl. Polym. Sci.* 66:1163-1173 (1997)).

FIG. 1 also shows that there was very little difference in the spectra of the modified wood particles before extraction (spectrum C) and after the first (spectrum D) and second extractions (spectrum E). This finding provides important evidence that the maleated polyethylene was chemically bonded to the wood particles. If the maleated polyethylene had not grafted to the particles, a decrease in peak intensity, or a loss of the two distinct peaks near 2900 $cm^{-1}$ would have been expected after the extraction, which would remove maleated polyethylene not chemically bonded to the wood particles (Li, Q., et al., *J. Appl. Polym. Sci.,* 88:278-286 (2003)).

Table 2 shows the XPS results for the unmodified and modified wood particles.

TABLE 2

High-resolution $C_{1s}$ peaks and elemental surface compositions of wood particles (before and after treatments) determined by XPS

| Wood particles | Analysis of $C_{1s}$ peaks (%)[1] C1 | C2 | C3 | C4 | Elemental compositions (%) O | C | O/C atomic ratios |
|---|---|---|---|---|---|---|---|
| Unmodified | 39.75 | 51.20 | 8.46 | 0.58 | 31.85 | 68.15 | 0.47 |
| Modified with 20% maleated PE | 95.08 | 4.34 | 0.58 | 0.0 | 2.97 | 97.03 | 0.03 |

[1]Carbon component C1 arises from carbon atoms bonded only to carbon and/or hydrogen atoms (C—C/C—H), C2 from carbon atoms bonded to a single oxygen atom, other than a carbonyl oxygen (C—OH), C3 arises from carbon atoms bonded to two non-carbonyl oxygen atoms or to a single carbonyl oxygen atom (O—C—O, C═O) and C4 carbon type comes from carbon atoms which are linked to a carbonyl and a non-carbonyl group (O—C═O) (Li, Q., et al., J. Appl. Polym. Sci., 88: 278-286 (2003)).

The XPS data confirmed the findings of the FTIR analysis. As expected, a significant increase in C1, which is from carbon bound only to carbon (C—C) or hydrogen (C—H) atoms (Matuana, L. M., et al., *Wood Sci. Technol.,* 35:191-201 (2001)), was observed after surface modification of wood particles with maleated polyethylene. In addition, the content of oxidized carbon atoms (C2-C4) significantly decreased in the modified particles, along with the O/C atomic ratio, which was also expected due to the large increase in aliphatic carbon atoms on the surface of the maleated wood particles (Li, Q., et al., *J. Appl. Polym. Sci.,* 88:278-286 (2003)). The O/C atomic ratio showed that the surface of the wood particles changed dramatically with modification, decreasing from 0.47 to 0.03. A change this large likely indicates that the reactive extrusion procedure was very successful in grafting maleated polyethylene to the wood particles.

Mechanical Properties

Table 3 shows the modulus of rupture (MOR) and modulus of elasticity (MOE) requirements for particleboard of medium density, ranging from 640-800 $kg/m^3$.

TABLE 3

Requirements for various grades of particleboard

| Particleboard of medium density (640-800 $kg/m^3$) | ANSI Grade[1] M-1 | M-S | M-2 | M-3 | Experimental Values[2] |
|---|---|---|---|---|---|
| MOR ($N/mm^2$) | 11.0 | 12.5 | 14.5 | 16.5 | 17.64 ± 5.8 |
| MOE ($N/mm^2$) | 1725 | 1900 | 2250 | 2750 | 1229 ± 292 |

From Standard ANSI A208.1-1999 Particle board (ANSI A208.1-1999, Particleboard, The Composite Panel Association, Gaithersburg, 1-11 (1999))
[1]Grades M-1 and M-S are for commercial use, either interior or exterior use whereas grades M-2 and M-3 are for industrial use, either interior or exterior use.
[2]The sample density is 770 ± 15 $kg/m^3$. This represents an average of three panels.

The composite panels manufactured in this invention were within this range, with an average density value of 770±15 $kg/m^3$. As listed in the Table, there are four grades of particleboard of medium density, all of which can be made with either interior or exterior adhesives. Grades M-1 and M-S are commercial grade boards, while M-2 and M-3 are intended for industrial use. Panels for outdoor use must also be labeled exterior, according to the ANSI standard for particleboard (ANSI A208.1-1999, Particleboard, The Composite Panel Association, Gaithersburg, 1-11 (1999)). The MOR results for our particleboard indicated that the standard requirements have been met for all grades of particleboard of medium density. These results are significant because particleboard is currently manufactured with formaldehyde-based adhesives. The formaldehyde-free biocomposites manufactured in this invention are more environmentally friendly and still meet the MOR requirements listed in the standard ANSI A208.1. However, the MOE data showed that these composites do not yet meet the stiffness requirement for particleboard of medium density. Our ongoing research showed that the 3-minute pressing tine used here was not sufficient to allow adequate heat flow into the center of the panels, resulting in lower MOE values.

EXAMPLES 2 TO 10

The following Examples 2 to 10 are experiments in forming the composites of the present invention.

Experimental

Materials

Maleated polyethylene was used as coupling agents. Hydrated zinc acetate ($ZnAc_2 2H_2O$) was used as a catalyst for esterification reaction. Maple wood flour of 425 micron (40 mesh size) was used as wood particles.

Compounding and Reactive Extrusion of Wood Fibers

Before extruding, dried wood, coupling agent and catalyst were dry-blended in a high intensity turbine mixer for 5 minutes. The coupling agent contents varied from 5 to 20 wt. % while the catalyst addition level was fixed at 1 wt. % of the total weight of the panel. The remainder was wood flour.

Unless otherwise mentioned, after blending, the compounded mixtures were extruded through a 32 mm conical co-rotating twin-screw extruder with a L/D ratio of 13:1 driven by 7.5 hp Intelli-Torque Plasti-Corder Torque Rheometer® (C.W. Brabender instruments, Inc.) for surface modification of wood. The extruder barrel temperature profile for 3 heating zones and screw speed rate were set at 160/160/160° C. and 80 rpm, respectively.

Composite Manufacture and Property Testing

The surface modified-wood flour were manually placed in a 15" by 15" forming mat box and hot pressed in a laboratory press using the following press cycle: (Press closing time: 30 seconds to press stops, Pressing times at stops: 180 seconds, Decompression time: ~30 seconds, Platen temperature: 193° C.). The pressing pressure was 1100 psi and the panel thickness was ¼-inches to give a targeted density of ~45 lbs/ft$^3$ (720 kg/m$^3$).

Test specimens for property characterization were cut from the panels and conditioned to a constant weight in a walk-in temperature/humidity-controlled room, set at 12 wt % equilibrium moisture content. The density, flexural strength (modulus of rupture of MOR) and flexural stiffness (modulus of elasticity or MOE), internal bond (IB), thickness swell (ThS) and water absorption (WA) were determined in accordance with the procedure outlined in ASTM D1037 (ASTM D1037 1999).

Panels were also pressed from 20% maleated polyethylene with 1% zinc acetate catalyst and 79% maple flour (standard mixture) but the wood particles were not extruded prior to pressing. The high intensity mixer was the only processing step before hot pressing.

Results and Some Remarks

Table 4 summarizes the experimental results.

TABLE 4

Physico-mechanical properties of various formaldehyde-bonded wood products and our laboratory made panels with MAPE.

| SAMPLES | Thickness (mm) | Density kg/m$^3$ | WA (%) | ThS (%) | MOR (MPa) | MOR (psi) | MOE (MPa) | MOE (psi) | IB (MPa) | IB (psi) |
|---|---|---|---|---|---|---|---|---|---|---|
| HARDBOARD[1] | | | | | | | ns | | | |
| Tempered | 6.4 | ns | 20 | 15 | 41.4 | 6003 | ns | | 0.90 | 131 |
| Standard | 6.4 | ns | 25 | 20 | 31.0 | 4495 | ns | | 0.62 | 90 |
| Service Tempered | 6.4 | ns | 30 | 25 | 31.0 | 4495 | ns | | 0.52 | 75 |
| Hardboard Siding | 6.4 | ns | 12 | 8 | 20.7 | 3002 | ns | | ns | |
| PARTICLEBOARD[2] | | | | | | | | | | |
| M-1 | ns | 640-800 | ns | ns | 11.0 | 1595 | 1725 | 250125 | 0.40 | 58 |
| M-S | ns | 640-800 | ns | ns | 12.5 | 1813 | 1900 | 275500 | 0.40 | 58 |
| M-2 | ns | 640-800 | ns | ns | 14.5 | 2103 | 2225 | 322625 | 0.45 | 65 |
| M-3 | ns | 640-800 | ns | ns | 16.5 | 2393 | 2750 | 398750 | 0.55 | 80 |
| LD-1 | ns | <640 | ns | ns | 3.0 | 435 | 550 | 79750 | 0.10 | 15 |
| LD-2 | ns | <640 | ns | ns | 5.0 | 725 | 1025 | 148625 | 0.15 | 22 |
| PB underlayment | ns | ns | ns | ns | 11.0 | 1595 | 1725 | 250125 | 0.40 | 58 |
| MDF[3] | | | | | | | | | | |
| HD - interior | ns | >800 | ns | ns | 34.5 | 5003 | 3450 | 500250 | 0.75 | 109 |
| MD - interior | <21 | 640-800 | ns | ns | 24.0 | 3480 | 2400 | 348000 | 0.60 | 87 |
| LD - interior | <21 | <640 | ns | ns | 14.0 | 2030 | 1400 | 203000 | 0.30 | 44 |
| MD - exterior | <21 | 640-800 | ns | ns | 34.5 | 5003 | 3450 | 500250 | 0.90 | 131 |
| OUR PANELS-EXTRUDED | | | | | | | | | | |
| 5% 3 min | 6 | 770 | 99 | 43 | 2.6 | 373 | 802 | 116287 | 0.20 | 29 |
| 7.5% 3 min | 6 | 772 | 79 | 34 | 7.9 | 1151 | 1401 | 203167 | 0.18 | 26 |
| 10% 3 min | 6 | 772 | 66 | 24 | 10.8 | 1568 | 1482 | 214950 | 0.69 | 100 |
| 15% 3 min | 6 | 772 | 46 | 16 | 12.5 | 1819 | 1197 | 173517 | 0.83 | 121 |

TABLE 4-continued

Physico-mechanical properties of various formaldehyde-bonded wood products and our laboratory made panels with MAPE.

| SAMPLES | Thickness (mm) | Density kg/m$^3$ | WA (%) | ThS (%) | MOR (MPa) | MOR (psi) | MOE (MPa) | MOE (psi) | IB (MPa) | IB (psi) |
|---|---|---|---|---|---|---|---|---|---|---|
| 20% 3 min | 6 | 770 | 32 | 8.7 | 17.7 | 2560 | 1229 | 178167 | 1.70 | 246 |
| 20% 3 min | 6 | 770 | 32 | 8.7 | 17.7 | 2560 | 1229 | 178167 | 1.70 | 246 |
| 20% 7 min | 6 | 778 | 9 | 5.3 | 20.7 | 3002 | 1296 | 187988 | 2.14 | 310 |
| 20% 9 min | 6 | 775 | 12 | 9.5 | 18.0 | 2611 | 1245 | 180483 | 2.34 | 340 |
| 20% 12 min | 6 | 772 | 12 | 7.6 | 18.5 | 2681 | 1199 | 173800 | 1.63 | 236 |
| OUR PANELS-UNEXTRUDED | | | | | | | | | | |
| 20% 7 min | 6 | 780 | 28 | 8.5 | 26.3 | 3811 | 2083 | 301982 | 1.16 | 168 |
| 20% 9 min | 6 | 784 | 19 | 6.6 | 24.7 | 3579 | 1905 | 276273 | 1.34 | 195 |

[1]From standards ANSI/AHA A 135.4-1995-Basic Hardboard and ANSI/AHA A 135.6-1990-Hardboard Siding
[2]From standard ANSI A 208.1-1999-Particleboard
[3]From standard ANSI A 208.2-1999 Medium Density Fiberboard (MDF)

EXAMPLE 2

Experimental

Materials

Materials used were the same as in Example 1, except that four different maleated polypropylene (MAPP) coupling agents from Eastman Chemical Co., (Kingsport, Tenn.) with different molecular weights (MW) were used instead of the MAPE. The coupling agents were E-43 (MW 11,200), G-3216 (MW 39,000), G-3015 (MW 47,000) and G-3003 (MW 52,000). The G-3216 is a polyethylene/polypropylene copolymer.

Reactive Extrusion of Wood Particles

Reactive extrusion was carried out as described in Example 1, except the extruder barrel temperature was held at 165° C., and the rotational speed of the screws was held at 60 rpm. All batches were prepared with 20% coupling agent, as in Table 1 of Example 1.

Panel Manufacturing and Property Testing

Panels were manufactured and tested as described in Example 1, except that some panels were prepared by pressing the mixed particles without doing the reactive extrusion step (unextruded panels).

Results and Discussion

Mechanical property test results for the panels made with the various MAPP coupling agents are shown in Table 5, along with standard requirements for various formaldehyde-based glue bonded wood panel products. Results of these tests indicate that the panels made with these coupling agents, whether extruded or not, meet or even in some cases exceed the standard requirements for particleboard of medium density. The internal bond (IB) strength of the panels pressed without the extrusion step is lower than that of the extruded panels. Since IB is a good measure of the degree of adhesion between particles, this indicates that the particles do not adhere as well if they are not extruded. This may be due to increased particle and coupling agent contact and reaction during extrusion, as well as the extra heat to drive the reaction. However, the MOR (strength) and MOE (stiffness) of the unextruded panels are higher than those of the extruded panels made with the same coupling agent.

TABLE 5

Physico-mechanical properties of various formaldehyde-bonded wood products and our laboratory made panels with MAPP.

| SAMPLES | Thickness (mm) | Density kg/m$^3$ | WA (%) | ThS (%) | MOR (MPa) | MOR (psi) | MOE (MPa) | MOE (psi) | IB (MPa) | IB (psi) |
|---|---|---|---|---|---|---|---|---|---|---|
| HARDBOARD[1] | | | | | | | ns | | | |
| Tempered | 6.4 | ns | 20 | 15 | 41.4 | 6003 | ns | | 0.90 | 131 |
| Standard | 6.4 | ns | 25 | 20 | 31.0 | 4495 | ns | | 0.62 | 90 |
| Service Tempered | 6.4 | ns | 30 | 25 | 31.0 | 4495 | ns | | 0.52 | 75 |
| Hardboard Siding | 6.4 | ns | 12 | 8 | 20.7 | 3002 | ns | | ns | |
| PARTICLEBOARD[2] | | | | | | | | | | |
| M-1 | ns | 640-800 | ns | ns | 11.0 | 1595 | 1725 | 250125 | 0.40 | 58 |
| M-S | ns | 640-800 | ns | ns | 12.5 | 1813 | 1900 | 275500 | 0.40 | 58 |
| M-2 | ns | 640-800 | ns | ns | 14.5 | 2103 | 2225 | 322625 | 0.45 | 65 |
| M-3 | ns | 640-800 | ns | ns | 16.5 | 2393 | 2750 | 398750 | 0.55 | 80 |
| LD-1 | ns | <640 | ns | ns | 3.0 | 435 | 550 | 79750 | 0.10 | 15 |
| LD-2 | ns | <640 | ns | ns | 5.0 | 725 | 1025 | 148625 | 0.15 | 22 |
| PB underlayment | ns | ns | ns | ns | 11.0 | 1595 | 1725 | 250125 | 0.40 | 58 |

TABLE 5-continued

Physico-mechanical properties of various formaldehyde-bonded wood products and our laboratory made panels with MAPP.

| SAMPLES | Thickness (mm) | Density kg/m$^3$ | WA (%) | ThS (%) | MOR (MPa) | MOR (psi) | MOE (MPa) | MOE (psi) | IB (MPa) | IB (psi) |
|---|---|---|---|---|---|---|---|---|---|---|
| MDF[3] | | | | | | | | | | |
| HD - interior | ns | >800 | ns | ns | 34.5 | 5003 | 3450 | 500250 | 0.75 | 109 |
| MD - interior | <21 | 640-800 | ns | ns | 24.0 | 3480 | 2400 | 348000 | 0.60 | 87 |
| LD - interior | <21 | <640 | ns | ns | 14.0 | 2030 | 1400 | 203000 | 0.30 | 44 |
| MD - exterior | <21 | 640-800 | ns | ns | 34.5 | 5003 | 3450 | 500250 | 0.90 | 131 |
| OUR PANELS-EXTRUDED[4] | | | | | | | | | | |
| G-3003 | 6 | 775 | 12 | 7 | 22.4 | 3251 | 2821 | 409060 | 1.43 | 207 |
| G-3015 | 6 | 782 | 16 | 6 | 19.6 | 2836 | 2635 | 382051 | 1.59 | 230 |
| OUR PANELS-UNEXTRUDED[4] | | | | | | | | | | |
| E-43 | 6 | 774 | 18 | 10 | 12.16 | 1764 | 3431 | 497500 | 0.62 | 90 |
| G-3003 | 6 | 775 | 21 | 6 | 29.37 | 4259 | 3487 | 505580 | 0.43 | 62 |
| G-3015 | 6 | 780 | 32 | 8 | 29.16 | 4228 | 3456 | 501180 | 0.31 | 46 |
| G-3216 | 6 | 778 | 35 | 11 | 18.62 | 2700 | 2967 | 430280 | 0.49 | 71 |

[1]From standards ANSI/AHA A 135.4-1995-Basic Hardboard and ANSI/AHA A 135.6-1990-Hardboard Siding
[2]From standard ANSI A 208.1-1999-Particleboard
[3]From standard ANSI A 208.2-1999 Medium Density Fiberboard (MDF)
[4]Panels contained 20% MAPP and were pressed at 193° C. for 7 min, 1100 psi pressure

EXAMPLE 3

Experimental

Materials

Materials used are the same as in Examples 1 and 2, except that a crosslinking initiator such as dicumyl peroxide or benzoyl peroxide is used in some cases. In other cases, a vinylsilane compound is used as the crosslinking chemical. In a third process, UV radiation is used to initiate crosslinking in the modified wood fibers. When the material to be crosslinked is MAPP-modified wood particles, a co-agent such as tetramethylolmethane tetraacrylate or hydroquinone is used along with the peroxide and/or radiation to increase the crosslinking efficiency and to reduce detrimental reactions within the PP, which result in a loss in mechanical properties.

Reactive Extrusion of Wood Particles

Prior to crosslinking, reactive extrusion is carried out as described in Examples 1 for MAPE and 2 for MAPP-modified wood particles.

Crosslinking of Polyolefin Moiety in Modified Wood Particles

Modified wood particles prepared as in Examples 1 and 2 are crosslinked through the following processes:

Crosslinking chemicals (peroxide and co-agent or vinylsilane) are mixed with the modified wood particles in a high-intensity mixer, and then the mixture is fed into the extruder. This second run through the extruder serves to activate the crosslinking chemicals and cause the crosslinking reaction to occur in the polyolefin portion of the modified wood particles. When the crosslinking chemical used is vinylsilane, the extruded fibers are steamed after extrusion or placed in a high humidity chamber to cause the final crosslinking of the polyolefin.

A second process uses a UV radiation source to crosslink the polyolefin in modified wood particles. The modified wood particles are mixed with co-agent and run through a UV radiation source to initiate the crosslinking. The wood particles are stirred to re-distribute them and run multiple times to achieve the desired level of crosslinking.

Panel Manufacturing and Property Testing

Panels are manufactured and tested as described in Example 1. Some panels are also pressed from fibers that were mixed with the crosslinking chemicals without a further reactive extrusion step.

Various means can cause the reaction of the anhydride with the wood fibers or particles. It is preferred to use various esterification catalysts.

For comparison, property values of various wood-based composite materials obtained from different standards are also listed.

Table 6 shows a comparison of properties of Wood-HDPE and Wood-MAPE samples. The Wood-MAPE sample was significantly better.

TABLE 6

| Properties | Wood - HDPE (80/20)[1,2] | Wood - MAPE (80/20)[1,2] |
|---|---|---|
| MOR (MPa) | 6.36 ± 2.3 | 20.7 ± 3.4 |
| MOE (GPa) | 0.95 ± 0.3 | 1.3 ± 0.2 |
| IB (MPa) | 0.3 ± 0.1 | 2.1 ± 1.1 |

[1]The numbers in parentheses are composition by percent for the composite
[2]These panels are 80% wood and 20% coupling agent or HDPE, pressed for 7 minutes at 8 MPa and 193° C.

The following conclusions can be drawn:

A new type of environmentally friendly biocomposite product could be formed from the surface-modified wood particles. This composite contained no formaldehyde-based adhesive, but still performed favorably in all physical and mechanical properties test.

The composite panels met and even exceeded the standard requirements for various formaldehyde-bonded wood products.

Satisfactory or even better properties can also be achieved without reactive extrusion step, i.e., by just using a high intensity mixer with or without heat.

Conclusions

These examples examined modifying maple particles with maleated polyethylene in a reactive extrusion procedure in order to make formaldehyde-free biocomposite panels.

FTIR and XPS results verified the reaction between wood particles and maleated polyethylene. This proved that the maleated polyethylene could be successfully grafted to wood particles using a reactive extrusion process, without the use of any solvents.

The invention also showed that a new type of environmentally friendly biocomposite product could be formed from the maleated wood particles. This composite contained no formaldehyde-based adhesive, but still performed favorably in flexural tests. The MOE was lower than required by the standards.

EXAMPLES 11 TO 20

These Examples 11 to 20 investigated the contrasts of (i) base resin type, PE vs. PP, (ii) molecular weight/maleic anhydride content in MAPP binding agents, and (iii) the manufacturing methods (reactive extrusion vs. hot press) on the physico-mechanical properties of the composites.

Experimental

Materials

Maple wood particles of 425 micron (40-mesh) size were supplied by American Wood Fibers (Schofield, Wis.) and were used as particles. Hydrated zinc acetate, the esterification catalyst, was obtained from Baker Analytical Reagents (JT Baker Co., Phillipsburg, N.J.). Maleated polyethylene-MAPE (G-2608) and two maleated polypropylenes-MAPP (G-3003 and G-3015) supplied by Eastman Chemical Co. (Kingsport, Tenn.) were used as binding agents. Characteristics of the maleated compounds are listed in Table 7. All other chemicals were used as received.

TABLE 7

Characteristics of the maleated polyolefins used as binding agents

| Properties | MAPE G-2608 | MAPP G-3003 | MAPP G-3015 |
|---|---|---|---|
| Weight % maleic anhydride | 1.5 | 1.5 | 2.5 |
| Melting point (° C.) | 122 | 156 | 155 |
| Average molecular weight (g/mol) | 51,700 | 52,000 | 47,000 |
| [1]Melt flow index at 190° C. | 8 | 12.7 | — |
| Viscosity at 190° C. | — | 60,000 | 25,000 |

[1]Melt flow index measured at 190° C. and 2.16 kg according to ASTM D1238.

Compounding of Wood Particles and Panel Manufacture

The wood particles were dried for 48 hours at 105° C. to a final moisture content of less than one percent before processing. A 10-liter high intensity mixer (Papenmeier TGAHK20) was used for dry blending of the wood particles, binding agent, and catalyst. The wood:binding agent:catalyst weight ratio was 79:20:1. All components were combined in the mixer and blended for 10 minutes at room temperature.

Two different methods were used to manufacture the composite panels from the above-described compounded wood particles as follows:

The first method was a one-step process where the compounded wood particle mixtures were directly hot pressed without the reactive extrusion step. Compression molding was performed using a hydraulic press from Erie Mill Co. (Erie, Pa.). Panels were pressed at 193° C. for 7 minutes using 8 MPa pressure. After pressing, panels were removed from the press and cooled at room temperature under compression for 15 minutes. Panel dimensions were 380 by 380 by 6 mm, with a target density of 720 kg/m$^3$.

The second method was a two-step process where wood particles were modified with maleated polyolefins in a reactive extrusion process, and then compression molded in a hot press. Reactive extrusion of wood particles was achieved by feeding the compounded wood particles into a 32 mm conical counter rotating twin-screw extruder (C.W. Brabender Instruments, Inc.) with an L/D ratio of 13:1, driven by a 7.5 hp Intelli-Torque Plasti-Corder Torque Rheometer®. The barrel temperatures for the three zones inside the extruder were set at 160° C. for maleated polyethylene and 165° C. for maleated polypropylene, and the rotational speed of the screws was held at 60 rpm during the experiments. Once extruded, the wood particles were compression molded into panels using the above-described pressing conditions.

Panel Property Testing

Density was measured by two methods for all panels: (i) a simple mass over volume calculation for three panels of each type and (ii) internal density profile (X-ray density analysis) using a Quintek QMS Density Profiler, model QDP-01X, Quintek Measurement Systems, Inc. (Oak Ridge, Tenn.) with 5 replicates per panel type.

Three-point flexural, internal bond (IB) strength and screw holding capacity tests were performed on an Instron 4206 testing machine (using Series IX software) in accordance with procedures outlined in ASTM standard D1037-99 (Kazayawoko, J. S. M.,. et al., Holzforschung, 46 (3): 257-261 (1992)). The crosshead speeds were 3.05 mm/min, 8.13 mm/min, and 0.6 mm/min for flexural, IB, and screw holding capacity tests, respectively. Screw holding capacity was carried out from the face of the panels. At least six samples were tested to obtain an average value for modulus of rupture (MOR), modulus of elasticity (MOE), IB strength and screw holding capacity, all of which were compared with values listed for particleboard of medium density in the standard ANSI A208.1-1999 (Particleboard, The Composite Panel Association, Gaithersburg, 1-11 (1999)).

Statistical Analysis

A two-sample t-test was carried out with an a significance value of 0.05 to determine the effects of material compositions and manufacturing method on the density, flexural, internal bond and screw holding properties of the composites. Comparisons between binding agents' base resin types or maleic anhydride contents and molecular weights were made under one manufacturing method. Whereas comparisons between manufacturing methods were performed under one base resin type or maleic anhydride content/molecular weight. All statistical analysis was performed using Design Expert software (Version 6) from Stat-Ease, Inc. Minneapolis, Minn.

Results and Discussion

Effects of Processing Conditions:

Composite panels manufactured in these Examples were within the medium density range as specified in the ANSI standard A208.1, with average density values ranging from 775-780 kg/m$^3$. The calculated and overall (x-ray profile) density of the panels was nearly the same, regardless of the panel manufacturing method. However, the density profile data indicated higher density in the face region of the panels than in the core region. The manufacturing method showed two distinct trends in the density of the composite panels. Panels made from unextruded wood particles had a higher density in the face region than those containing extruded wood particles. Conversely, panels manufactured from extruded wood particles had a higher density in the core region.

Mechanical properties of the composite panels differed depending on manufacturing processes (Table 9). Panels had significantly higher MOR and MOE values when the wood particles were not extruded prior to pressing. This was likely due to localized melting of the unreacted maleated compounds and greater flow at the faces of the panels, causing compaction in the face region, due to the direct heat from the platens. The faces would see more heat throughout the pressing cycle, likely causing the reaction between the wood and binding agent as well. Greater compaction of the face region of the panels was supported by the higher density of that region, as determined through X-ray density profile analysis (Table 8).

TABLE 8

Density data for experimental panels bound with maleated polyolefins

| Panel Types | Calculated Density ($kg/m^3$) | X-ray Density Profile Overall ($kg/m^3$) | Face ($kg/m^3$) | Core ($kg/m^3$) |
|---|---|---|---|---|
| 11 MAPE G-2608 - unextruded | 780 | 780 | 905 | 748 |
| 12 MAPE G-2608 - extruded | 778 | 779 | 881 | 759 |
| 13 MAPP G-3015 - unextruded | 780 | 781 | 906 | 745 |
| 14 MAPP G-3015 - extruded | 782 | 783 | 833 | 783 |
| 15 MAPP G-3003 - unextruded | 775 | 778 | 866 | 760 |
| 16 MAPP G-3003 - extruded | 775 | 776 | 821 | 760 |

Since overall density was relatively the same between the panels with extruded and unextruded wood particles, the increased face density of panels with unextruded wood particles must be responsible for the enhanced bending properties of these panels. Although panels made with extruded wood particles had lower bending properties than their unextruded counterparts, these panels still exceeded the requirements for conventional particleboard in most cases.

Table 9 summarizes the IB strength of the composite panels. Internal bond strength is an indication of how well the particles are bonded in the panel, particularly at the core region.

TABLE 9

Effects of processing methods and material compositions on the mechanical properties of particleboard panels bound with maleated polyolefins.

| Panel Types | Mechanical Properties[1] MOR (MPa) | MOE (MPa) | IB Strength (MPa) | Screw Holding (N) |
|---|---|---|---|---|
| Medium Density Grades (ANSI A208.1)[1] | 11.0-16.5 | 1725-2750 | 0.40-0.55 | 900-1100 |
| Experimental Panels[2] | | | | |
| 11 MAPE - unextruded | 25.41 ± 3.0$^A$ | 2068 ± 233$^A$ | 1.22 ± 0.32$^A$ | 1353 ± 184$^A$ |
| 12 MAPE - extruded | 20.70 ± 3.4$^B$ | 1296 ± 195$^B$ | 2.07 ± 0.69$^B$ | 1563 ± 180$^A$ |
| 13 MAPP - unextruded | 30.04 ± 6.6$^A$ | 3582 ± 567$^C$ | 0.43 ± 0.19$^C$ | 1469 ± 330$^A$ |
| 14 MAPP - extruded | 23.00 ± 4.7$^B$ | 2875 ± 347$^D$ | 1.50 ± 0.29$^D$ | 1580 ± 299$^A$ |

[1]Property requirement data is from standard ANSI A208.1 - 1999-Particleboard.
[2]The means with different letters indicate significance between treatments at the $\alpha = 0.05$ level, while the means with the same letter indicates no difference between treatments.

The experimental results indicated that the unextruded wood particles underwent both the grafting reaction and entanglement during compression molding since panels were successfully produced without pre-reacting wood particles in the extruder. Unlike the bending properties, panels prepared from unextruded wood particles had lower IB strength, compared to those made from extruded wood particles. Therefore, the lesser IB strength of composite panels with untreated wood particles is attributed to the reduced density in the core region of these boards, due to the heat not flowing to the center of the panel fast enough to cause the same amount of polymer flow and panel compaction during the limited pressing time. In addition, heat is required to drive the reaction between the wood particles and the maleated polyolefins. While the unextruded wood particles experience heat only during the hot pressing step, they may not receive sufficient heat to complete the esterification reaction and form chemical bonds between the wood and maleated polyolefins, especially in the core region of the panels. By contrast, wood particles that were pre-reacted in the extruder likely had much more extensive bonding due to the extra heat and mixing during the extrusion step. This accounts for the significantly higher IB strength in panels made with extruded wood particles.

Processing methods had no effect on the screw holding capacity, which was higher than the requirements for particleboard of medium density (Table 9).

Effects of Binding Agent Compositions

Two comparisons were made to determine significant effects of maleated polyolefin base resin types (PE vs. PP) (Table 9), maleic anhydride content in maleated polypropylene (1.5% vs. 2.5% by weight)/molecular weight (52,000 vs. 47,000 g/mol) on the mechanical properties of the composites (Table 10).

TABLE 10

Effect of molecular weight/maleic anhydride content of MAPP on the mechanical properties of particleboard panels bound with maleated polypropylenes

| Panel Types | Mechanical Properties MOR (MPa) | MOE (MPa) | IB Strength (MPa) | Screw Holding (N) |
|---|---|---|---|---|
| Medium Density Grades (ANSI A208.1)[1] | 11.0-16.5 | 1725-2750 | 0.40-0.55 | 900-1100 |

TABLE 10-continued

Effect of molecular weight/maleic anhydride content of MAPP on the mechanical properties of particleboard panels bound with maleated polypropylenes

| | Mechanical Properties | | | |
|---|---|---|---|---|
| Panel Types | MOR (MPa) | MOE (MPa) | IB Strength (MPa) | Screw Holding (N) |
| Experimental Panels[2] | | | | |
| 17 MAPP G-3003-unextruded | 30.04 ± 6.6$^{A}$ | 3582 ± 567$^{A}$ | 0.43 ± 0.19$^{A}$ | 1469 ± 330$^{A}$ |
| 18 MAPP G-3015-unextruded | 30.24 ± 8.6$^{A}$ | 3586 ± 698$^{A}$ | 0.36 ± 0.16$^{A}$ | 1445 ± 157$^{A}$ |
| 19 MAPP G-3015-extruded | 19.86 ± 4.9$^{B}$ | 2663 ± 270$^{B}$ | 1.60 ± 0.64$^{B}$ | 1552 ± 193$^{A}$ |
| 20 MAPP G-3003-extruded | 23.00 ± 4.7$^{B}$ | 2875 ± 347$^{B}$ | 1.50 ± 0.29$^{B}$ | 1580 ± 299$^{A}$ |

[1]Property requirement data is from standard ANSI A208.1 - 1999-Particleboard.
[2]The means with different letters indicate significance between treatments at the $\alpha = 0.05$ level, while the means with the same letter indicates no difference between treatments.

Composite panels with polypropylene-based binding agents outperformed their polyethylene counterparts in stiffness (MOE), regardless of manufacturing method used, mainly due to the higher stiffness of polypropylene in the binding agent. However, the strength of the composites (MOR) was not affected by the type of base resin of the maleated polyolefin since both PE and PP behave similarly, regardless of the processing method. Conversely, panels made with maleated polyethylene outperformed those made with maleated polypropylene in IB strength, likely due to the lower melting temperature of polyethylene. Lower melting temperature would allow the polyethylene-based compound to flow to a greater extent even into the center region of the panels, causing stronger internal bonding. The screw holding capacity of the panels was not affected by the resin type in maleated polyolefin (Table 9).

Differences between the two maleated polypropylene compounds were not significant for any of the mechanical properties tested. The weight average molecular weights of the two MAPPs differed only by 5,000 g/mol, and the difference in maleic anhydride content was 1% between the two. These polymers may have been similar enough that they did not create significant differences in the composite panel properties (Table 10).

Comparison with Standard ANSI A208.1

The MOR, IB strength and screw holding capacity results for our panels indicated that the standard requirements have been met and surpassed for all grades of particleboard of medium density when the particles were extruded before pressing. Without the extrusion step, the IB strength is within the required range with maleated polypropylene, and surpassed when PE-based binding agent was used. MOE data are below the standard requirements for stiffness when MAPE was used with extrusion, but the panels with unextruded wood particles bonded with MAPE surpassed the stiffness requirements. Additionally, when MAPP was used, the panels exceed the requirements for all grades of particleboard of medium density, regardless of processing conditions.

SUMMARY of FINDINGS

Superior bending properties were obtained from hot pressing alone.

Extruding modified wood particles before hot pressing resulted in better overall IB strength.

Manufacturing method had no effect on screw holding capacity.

Regardless of processing conditions, a new type of formaldehyde-free wood composite product could be made.

MAPP based panels outperformed MAPE based panels in stiffness.

MAPE resulted in higher IB strength compared to MAPP.

Polymer base resin had no effect on MOR or screw holding capacity.

No significant differences were found between MW/maleic anhydride content of MAPP for mechanical properties tested.

It is intended that the foregoing description be only illustrative of the present invention and that the present invention be limited only by the hereinafter appended claims.

We claim:

1. A process for the preparation of a wood fiber or particle based composite which comprises:

(a) providing a mixture of dried wood fibers or particles and a maleic anhydride moiety coupled to a polyolefin prepared from a monomer containing 2 to 8 carbon atoms as a maleated polyolefin, and combinations thereof, in absence of a non-maleated polyolefin, and optionally an esterification catalyst for reacting the esterification maleic anhydride moiety with the wood fiber or particle;

(b) pressing the mixture in a mold at an elevated temperature so that the maleic anhydride moiety binds with a surface of the wood fiber or particle and the composite is formed.

2. The process of claim 1 wherein the pressing is at a temperature between the melting point of the polyolefin to the decomposition temperature of the wood fiber or particle.

3. The process of claim 2 wherein the temperature is between about 130° C. and 220° C.

4. The process of any one of claims 1, 2, or 3 wherein the catalyst is hydrated zinc acetate.

5. The process of any one of claims 1, 2, or 3 wherein the maleated polyolefin is between about 5 and 20 weight percent of the mixture and the catalyst is between about 0.01 to 1 percent by weight.

6. The process of claim 1 wherein the polyolefin coupled to the maleic anhydride is selected from the group consisting of maleated polyethylene and maleated polypropylene.

7. The process of claim 6 wherein the polyolefin has an average molecular weight between about 10,000 and 100,000.

8. The process of claim 1 wherein the mixture is provided by extrusion or blending of the fiber or particle and polyolefin coupled to the maleic anhydride.

9. The process of claim 1, wherein:

the mixture in step (a) consists essentially of the dried wood fibers or particles, the maleated polyolefin, and the optional esterification catalyst.

10. The process of claim 1, wherein:

the mixture in step (a) is in the absence of a polymer without the maleic anhydride moiety.

11. The process of claim 1, wherein:

the composite comprises about 10 wt. % to 20 wt. % of the maleated polyolefin.

12. The process of claim 1, wherein:

the composite comprises about 15 wt. % to 20 wt. % of the maleated polyolefin.

13. The process of claim 1, wherein:

the composite comprises about 79 wt. % to 94 wt. % of the dried wood fibers or particles.

14. The process of claim 1, wherein:

the dried wood fibers or particles comprise wood flour.

15. The process of claim 1, further comprising: crosslinking the maleated polyolefin in the mixture with one or more crosslinking chemicals prior to pressing the mixture in step (b).

16. A process for the forming of a wood fiber or particle based composite which comprises:

(a) providing a mixture of a dried wood fiber or particle and a maleic anhydride moiety coupled to a polyolefin prepared from a monomer containing 2 to 8 carbon atoms as a maleated polyolefin, and combinations thereof, in absence of a non-maleated polyolefin, and optionally an esterification catalyst for reacting the esterification maleic anhydride moiety with the wood fiber or particle;

(b) reactively extruding in a screw extruder the mixture at a temperature of between about 130° C. to 220° C. so that the maleic anhydride moiety bonds with a surface of the wood or particle fiber to produce a surface modified fiber or particle (SMF); and (c) pressing the SMF in a mold to form the composite.

17. The process of claim 16 wherein the pressing is at a temperature between the melting point of the polyolefin to the decomposition temperature of the wood fiber or particle.

18. The process of any one of claims 16 or 17 wherein the catalyst is hydrated zinc acetate.

19. The process of claim 16 wherein the extruder has twin counter-rotating screws.

20. The process of any one of claims 16 or 17 wherein the polyolefin is between about 5 and 20 weight percent of the mixture and the catalyst is between about 0.01 to 1 percent by weight.

21. The process of claim 16 wherein the polyolefin coupled to the maleic anhydride is selected from the group consisting of maleated polyethylene and maleated polypropylene.

22. The process of claim 21 wherein the maleated polyolefin has an average molecular weight between about 10,000 and 100,000.

23. The process of claim 16, wherein:

the mixture in step (a) consists essentially of the dried wood fiber or particle, the maleated polyolefin, and the optional esterification catalyst.

24. A process for the forming of a wood fiber or particle based composite which comprises:

(a) providing a mixture of a dried wood fiber or particle and a polymer with reactive anhydride moiety coupled to a polyolefin prepared from a monomer containing 2 to 8 carbon atoms, and combinations thereof, in absence of a polymer without the reactive moiety;

(b) reactively heating the mixture so that the moiety bonds with a surface of the wood or particle fiber to produce a surface modified fiber or particle (SMF); and (c) pressing the SMF in a mold to form the composite.

25. The process of claim 24 wherein the composite comprises about 79 wt. % to 94 wt. % of the dried wood fibers or particles.

26. The process of claim 24, wherein:

the mixture in step (a) consists essentially of the dried wood fiber or particle, the polymer with the reactive anhydride moiety coupled to the polyolefin, and an optional esterification catalyst.

27. The process of claim 26, wherein:

the composite comprises about 10 wt. % to 20 wt. % of the maleated polyolefin.

28. The process of claim 26, wherein:

the composite comprises about 15 wt. % to 20 wt. % of the maleated polyolefin.

29. A wood-plastic composite product produced by a process comprising:

(a) providing:

i. dry wood fibers or particles;

ii. a polyolefin polymer having an anhydride moiety reactive with the wood fiber or the particles moiety, in absence of a polyolefin without the moiety;

iii. a catalyst for reacting said polymer to said dry wood fibers or particles;

(b) mixing said wood fibers or particles, said polymer, and said catalyst;

(c) heating the mixture of step (b) so as to effect the reaction of the polymer reactive moiety with the wood fibers so as to produce surface-modified wood fibers (SMFs); and (d) attaching the SMFs of step (c) to each other via the polyolefin moiety of the polymer to produce the composite.

30. The composite product of claim 29 wherein the composite comprises about 79 wt. % to 94 wt. % of the dried wood fibers or particles.

31. The product produced by the process of claim 29, wherein the dry wood fibers or particles and the polymer are reactively mixed in step (b) in a screw extruder.

32. The product produced by the process of claim 31 wherein the dry wood fibers or particles and the polymer are mixed in step (b) in a kinetic mixer or heated mixer.

33. The product produced by the process of claim 29 wherein the SMFs are attached to each other by pressing in a mold.

34. The product produced by the process of claim 29, wherein steps (c) and (d) are conducted simultaneously by heating the mixture of step (b) under pressure in a mold.

35. The wood-plastic composite product of claim 29, wherein:

the mixing in step (b) comprises mixing a mixture consisting essentially of the dried wood fiber or particle, the polyolefin polymer having the reactive anhydride moiety, and the catalyst.

36. A wood-polymer composite consisting essentially of wood particles modified with a polymer, said polymer having a first part comprising an anhydride moiety reactive toward said wood fibers and a second part comprising the polyolefin polymer, said modified wood particles linked to each other via a second part of the polymer.

37. The wood-plastic composite of claim 36, wherein the polymer is a maleated polyolefin.

38. The composite of claim 36 wherein the modified polyolefin polymer is selected from the group consisting of maleated polypropylene and maleated polyethylene.

39. The composite of claim 38 wherein the modified polyolefin polymer has a molecular weight between about 10,000 and 100,000.

40. The composite of claim 36 wherein a cross linking chemical is provided between ends of the second part of the polymer.

* * * * *

UNITED STATES PATENT AND TRADEMARK OFFICE

CERTIFICATE OF CORRECTION

PATENT NO. : 7,605,197 B2
APPLICATION NO. : 11/186065
DATED : October 20, 2009
INVENTOR(S) : Matuana et al.

It is certified that error appears in the above-identified patent and that said Letters Patent is hereby corrected as shown below:

Column 16, line 43, "with an a significance" should be --with an α significance--.

Signed and Sealed this

Sixteenth Day of February, 2010

David J. Kappos
*Director of the United States Patent and Trademark Office*